Dec. 27, 1932.   B. STOCKFLETH   1,892,174
METHOD OF MAKING BEARING SLEEVES
Filed March 5, 1929
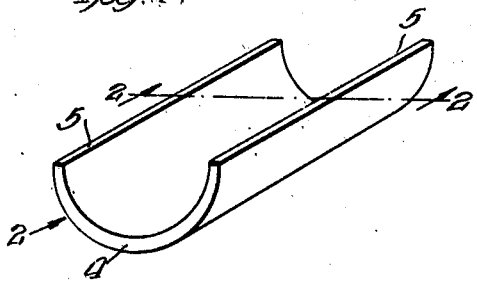
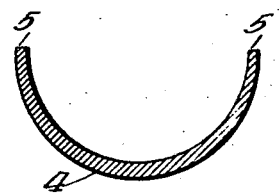
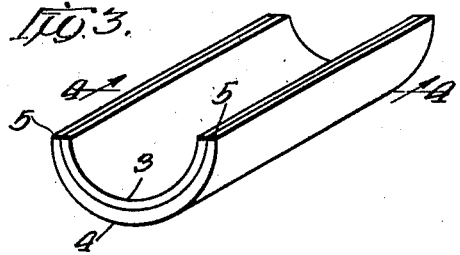
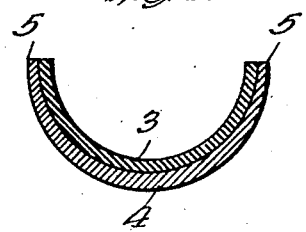
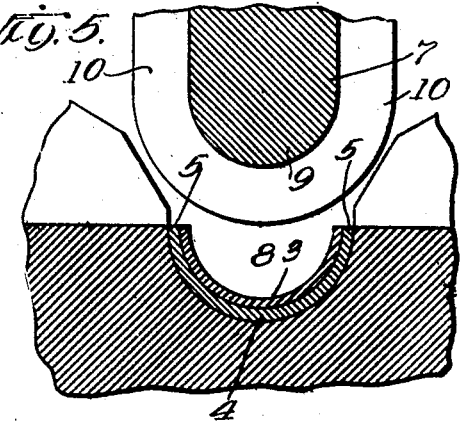
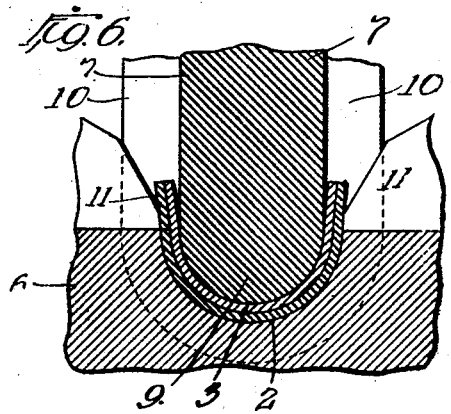
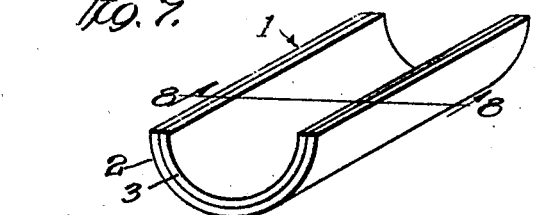
Witness:
Harry R. L. White.
Inventor:
Berger Stockfleth
By Edward Fay Wilson
Atty Patented Dec. 27, 1932

1,892,174

UNITED STATES PATENT OFFICE

BERGER STOCKFLETH, OF NILES, MICHIGAN, ASSIGNOR, BY MESNE ASSIGNMENTS, TO THE CLEVELAND GRAPHITE BRONZE COMPANY, OF CLEVELAND, OHIO, A CORPORATION OF OHIO

METHOD OF MAKING BEARING SLEEVES

Application filed March 5, 1929. Serial No. 344,369.

This invention relates to improvements in renewable bearing sleeves and has special reference to such sleeves which have backings of harder or cheaper metal such as steel and linings of softer and more expensive bearing metal such as Babbitt metal.

This present invention is an improvement and further development of the pressure method of forming, sizing and finishing bearing sleeves disclosed and claimed in U. S. Patent No. 1,492,119, issued April 29, 1924, to myself and Frederic W. Burger, and in the method of making such bearings disclosed and claimed in my co-pending application filed June 5, 1928, Serial No. 283,109 which has matured into Patent No. 1,851,934, issued March 29, 1932.

In the making of such composite bearing shells, the backing member is first provided, preferably roughly formed up out of sheet metal or by means of a casting of suitable metal such as steel, bronze, brass, etc.

The Babbitt metal lining is preferably cast upon the rough backs, and the rough sleeve thus prepared is thicker radially than the finished bearing to provide for the finishing of the bearing between suitable dies by which exceedingly heavy forming pressure is applied, which is sufficient not only to compress and thin the bearing radially, particularly along the bottom line thereof, but actually squeezes the metal so hard as to cause its elongation circumferentially and the extrusion from the dies of some of the metal along the longitudinal edges of the sleeve.

As the sleeves are usually made in half cylinders, the dies in which they are formed provide such a half cylindrical space between a hollow or grooved die and a plunger, and the plunger is arranged to enter the groove or forming space of the die and squeeze the bearing between same, thus applying the greatest pressure along the median line of the bearing sleeve.

In the production of such sleeves in the large quantities required, it is desirable, for obvious reasons, to produce them with the use of a minimum amount of thickness of the more expensive bearing metal. That is when the minimum thickness of the lining is determined, it tends to economy and reduction of costs to produce the finished bearing with the bearing metal of uniform thickness equal at all points to the determined minimum thickness.

In order that the lining of bearing metal shall be uniform in thickness and as the sleeve itself when finished is uniform in thickness, it follows that the backing must also be uniform in thickness. The heaviest pressure is applied in a direct line between the two die members, and this tends to squeeze the longitudinal central portion of the sleeve to such an extent as to cause an actual thinning of the harder backing metal. The direct pressure sufficient to thin down the backing metal decreases towards the sides of the die space until at the longitudinal edges of the bearing sleeve the backing metal is practically not thinned at all—merely extruded from the die space.

In carrying out the invention, the rough blanks for the backs are made of crescent shape in cross section; in other words, they are made enough thicker at the longitudinal central portion than at the longitudinal edges, and the thickness is gradually lessened toward the edges. The extent or amount of this extra thickness is sufficient to compensate for the thinning effect of the pressure so as to produce the finished bearing with the minimum thickness of the bearing metal preferably of uniform thickness throughout the bearing.

The invention will be more readily understood by reference to the accompanying drawing forming part of this specification and in which:—

Fig. 1 is a perspective view of a rough backing shell which I provide preparatory to making a bearing sleeve;

Fig. 2 is a cross-section of the back on the line 2—2 of Fig. 1;

Fig. 3 is a perspective view of the backing shell with the bearing metal lining added;

Fig. 4 is a cross-section on the line 4—4 of Fig. 3;

Fig. 5 is a fragmentary diagrammatic view showing the prepared bearing sleeve placed in a press preparatory to the application of the finishing and sizing pressing operation;

Fig. 6 is a view similar to Fig. 5 but showing the condition at the finish of the pressing operation;

Fig. 7 is a perspective view of a completed bearing sleeve; and

Fig. 8 is a cross-section on the line 8—8 of Fig. 7.

A finished bearing sleeve 1, as shown in Figs. 7 and 8, consists of a backing shell 2 of a relatively harder and/or cheaper metal such as steel and a lining 3 of bearing metal such as babbitt.

It is my particular object to produce such a bearing with a uniform thickness of the Babbitt metal and the lining as thin as is practicable in order to reduce cost.

As a first step in such a process, I provide backing shells 2, such as shown in Figs. 1 and 2, which are slightly crescent shaped in cross-section, being thicker along their longitudinal center line, as indicated at 4, and becoming gradually thinner towards their longitudinal edges 5. These backs may be produced by any suitable method such as casting them in such shape or making them up out of sheet metal by suitable rolling or forming processes.

The Babbitt metal lining is then applied to the backing by some suitable process such as that disclosed in Patent No. 1,803,513 issued to me May 5, 1931. The lining having been applied, as indicated in Figs. 3 and 4, of greater radial thickness than the finished thickness desired, the rough sleeve thus prepared is formed and sized between suitable die members 6 and 7. The die member 6 has a semi-cylindrical die opening 8 for forming, shaping and sizing the outer surface of the sleeve, and the die member 7 is in the form of a punch and is provided with a semi-cylindrical lower end 9 for forming, sizing and finishing the inner surface of the sleeve. The punch member 7 is provided with end flanges 10 which close the ends of the die space during the application of pressure to the sleeve. As shown in Fig. 6, the die members are forced together by a heavy pressure sufficient to cause the sleeves to be elongated circumferentially and thinned radially. As the greatest pressure is applied in the direct line of movement of the punch member 7, the greatest thinning effect is in the zone directly between the two die members, that is along the longitudinal center line of the sleeve. The pressure applied is sufficient to cause both the Babbitt metal and the backing to be exuded along the longitudinal edges of the sleeve, as shown at 11, Fig. 6.

As shown, the pressure is sufficient to thin down the back and make it, and the added thickness in the rough back is sufficient so that, when finished, the back is of uniform thickness, and as the dies are made to produce the finished sleeve of uniform thickness, the Babbitt metal lining is also of uniform thickness.

After the forming of the sleeve, as shown in Fig. 6, the exuded edge portions 11 can be removed by any suitable means but preferably by some simple cutting process.

Preferably, the edge portions 5 of the rough blank for the back are substantially of the thickness of the edges of the back in the finished sleeve, and when the sleeve is finished, as has been described, the back is of this thickness throughout.

Preferably, as best shown in Fig. 8, the backing of the cheaper metal in the finished sleeve constitutes somewhat more than one-half the thickness of the sleeve, the bearing metal lining being made thick enough to provide sufficient wear for the life of the bearing.

As many modifications of the invention will readily suggest themselves to one skilled in the art, I do not limit or confine the invention to the specific details of construction or process steps herein illustrated and described.

I claim:

1. The herein described method of making substantially half-cylindrical bearing sleeves having relatively hard, tough backs and bearing metal linings, which method consists in providing substantially half-cylindrical backs which are crescent shaped in transverse cross-section, and applying the bearing metal thereto to form a lining somewhat thicker than the finished thickness of the lining, and subjecting the rough sleeve thus formed to pressure applied substantially radially to the thicker part of the back, the pressure being sufficient to thin the back to substantially uniform thickness, and also to thin the lining to some extent the back and the lining being simultaneously substantially equally elongated.

2. The herein described method of forming bi-metal articles such as bearing sleeves, which consists in providing a shell of harder, tougher metal such as steel, and a lining of a softer metal such as Babbitt metal, the article roughly formed to shape but thicker than the finished article, the shell being thicker at some places than at others, applying pressure to the article substantially normal to the inner and outer surfaces, the pressure being applied first to the thicker parts of the shell through the softer metal and whereby said thicker parts are caused to be thinned in advance of the finishing of the article, the pressure being sufficient to cause the simultaneous thinning of the two metals and their substantial equal elongation.

In witness that I claim the foregoing as my invention, I affix my signature this 18th day of February, 1929.

BERGER STOCKFLETH.